Oct. 10, 1961    M. J. McDONALD    3,003,232
CITRUS FRUIT PEELER
Filed Oct. 22, 1959

INVENTOR.
MICHAEL J. McDONALD
BY
Paul A. Weilein
ATTORNEY.

3,003,232
CITRUS FRUIT PEELER
Michael J. McDonald, Ontario, Calif., assignor to Sunkist Growers, Inc., Los Angeles, Calif., a corporation of California
Filed Oct. 22, 1959, Ser. No. 848,027
2 Claims. (Cl. 30—24)

The present invention relates to a citrus fruit peeler and more particularly to a citrus fruit peeler which is especially effective in removing the peel from citrus fruit such as oranges, grapefruit and the like in an easy and efficient manner without damaging the tender inner skin.

Citrus fruit peelers or knives have been provided heretofore which, while being effective to remove the peel from citrus fruit, have been difficult to employ without severing the inner skin, thus liberating juices.

An object of the present invention is to provide a citrus fruit peeling device wherein the cutting and peel removing element of the device is so angularly related to the handle that use of the device is significantly simplified.

Another object is to provide a citrus fruit peeling device in which the peel cutting and removing element of the device is so constructed that the angle of the peel removing section of the cutting and peel removing element is not particularly critical, thus substantially facilitating usage of the implement.

Heretofore, citrus fruit peeling devices have been provided including a peel removing working element adapted to lie adjacent the inner skin of the citrus fruit, with a cutting section extending at a sharp angle to the peel removing section so that the disposition of the peel removing section relative to the contour of the body of the fruit has to be maintained within relatively close tolerances or the sharp edge formed at the juncture of the cutting section and the peel removing section of the element would have a tendency to dig into or sever the inner fruit skin, thus liberating juices, which, of course, is an objectionable occurrence.

Accordingly, it is an object of the present invention to provide a citrus peeling device including a peel removing element having a cutting section at its free end which is arcuate in form so that no sharp edges are provided which might dig into the inner fruit skin.

A further object is to provide a citrus peeling device wherein the peel removing section of the working element is disposed at such an angle relative to the handle that certain advantages accrue by way of handling of the implement by reason of the clearance provided between the handle and the body of the fruit during use of the implement.

Yet another object is to provide a citrus fruit peeling device which may be manipulated by either the right or the left hand of a user.

Other objects and advantages of the invention will be hereinafter described or will become apparent to those skilled in the art, and the novel features of the invention will be defined in the appended claims.

Referring to the drawing.

Like reference characters in the several figures of the drawing and in the following description designate corresponding parts.

Figure 2:
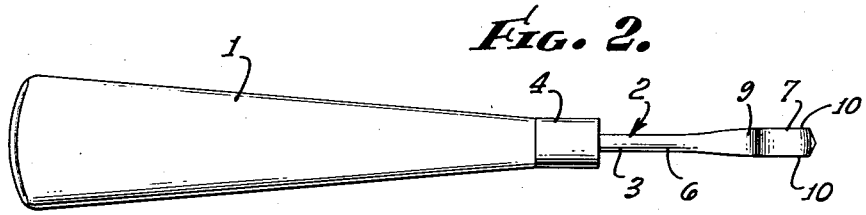
FIG. 2 is a top plan of the citrus fruit peeler hereof.
Figure 3:
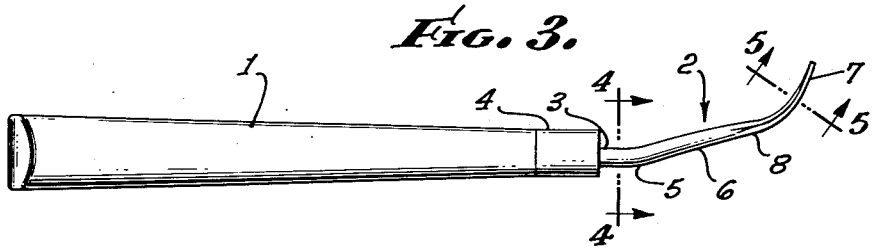
FIG. 3 is a side elevation of the citrus fruit peeler shown in FIG. 2.
Figure 4:
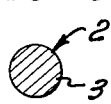
FIG. 4 is a view in section as taken on the line 4—4 of FIG. 3.

Referring particularly to FIGS. 2 and 3, it will be observed that the citrus fruit peeling device of the invention includes an appropriate handle 1 which is preferably elongated and tapered so as to facilitate gripping of the handle in a user's hand. At the small end of the handle 1 is a working element 2 having a shank 3 which is preferably embedded in the handle. A reinforcing ferrule 4 is disposed about the end of the handle so as to maintain the handle constrained about the shank 3 of the working element 2. It will be noted that the shank 3, in cross section, is circular, as best seen in FIG. 4, and such circular cross sectional form continues throughout a substantial portion of the length of the working element 2.

At a point spaced slightly outwardly from the end of the handle, the shank 3 is bent as at 5 so as to form with the handle 1 a rather wide obtuse angle. Between the bend 5 and the extreme free end of the working element 2 there are respectively, a peel removing section 6 and a peel severing section 7, these two sections merging at a point designated 8, which in proportion to the overall length of the working element is a substantial distance from the bend 5 in the working element. Between the bend 5 and the point 8 where the peel removing section joins the peel cutting section, the working element 2 is preferably arched slightly so as to more or less conform to the circular form of a citrus fruit to be peeled.

Figure 5:
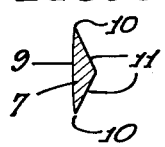
FIG. 5 is a view in section as taken on the line 5—5 of FIG. 3.

Beginning in the zone of the juncture of the cutting section 7 with the peel removing section 6 of the working element 2, the cutting section is of a slightly divergent form in lateral directions, and as best seen in FIG. 5, the upper surface 9 of the cutting section is slightly arcuate, that is, convex. The cutting section 7, as also best seen in FIG. 5 is provided with a pair of cutting edges 10, 10, with the outer and under surface of the cutting section 7 being formed on an angle providing a pair of angularly disposed faces 11, 11.

Figure 1:
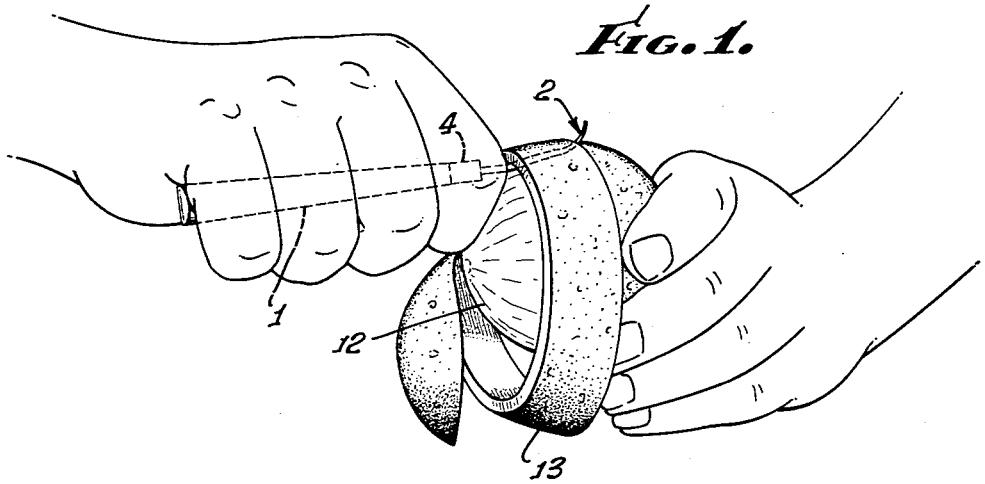
FIG. 1 is a view illustrating the manner of usage of the citrus fruit peeling device of the invention.
Figure 6:
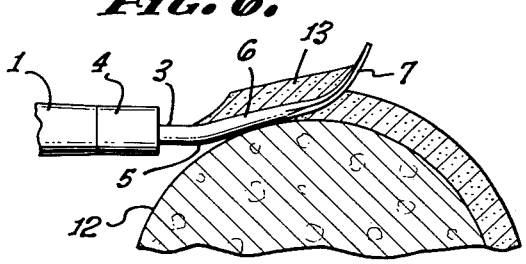
FIG. 6 is a fragmentary view showing the disposition of the working end of the device relative to a citrus fruit during usage of the device.

In the use of the peeling device hereof, as illustrated in FIG. 1, a citrus fruit may be held in one hand by a user of the device while the device is clasped by the handle in the other hand. The peel may then be removed from the citrus fruit by first cutting into the peel with the section 7 of the working end 2 of the device and then commencing to move the device generally helically about the fruit. During such motion a helical strip of peel will be removed as shown in FIG. 1. Referring to FIG. 6, the action of the working end of the device is shown. The peel removing section 6 will be seen to be generally conforming to the curvature of the body 12 of the fruit, and due to the circular cross section of the peel removing section 6, it will be recognized that irrespective of angular movement of the device about its axis, there is provided a rounded leading edge which will wedge the peel from the fruit without damaging the inner skin of the fruit as the cutting section 7 severs the strip 13 of peel from the body of the fruit.

As is particularly illustrated in FIG. 6, it will be noted that the arcuate juncture of the cutting section 7 and the peel removing section 6 of the working element presents no sharp edge which is capable of digging into the body of the fruit to sever the inner skin. Thus, the cutting section 7 may be disposed at such an angle as to enhance its shearing action as it passes through the peel, but without adversely affecting the action of the peel removing section 6 as previously pointed out. Moreover, the advancing angular face 11 of the cutting edge merging with the circular peel removing section of the working element 2 provides a smooth transition between the cutting section 7 and the peel removing section 6 by reason of the fact that the working element 2 in general, forms with the axis of the handle and the shank of the working element a relatively wide obtuse angle. It will also be noted with reference to FIG. 6 that the handle projects in a direction relative to the body of the fruit so as to provide a large clearance space between the handle and the fruit so that the same may be easily gripped by the user, as shown in FIG. 1. By reason of the symmetrical configuration of the working element 2 of the device, it may be employed in either the right or left hand of the user, and the same advantages will accrue.

While specific structural details have been shown and described, it should be understood that changes and alterations may be resorted to without departing from the spirit of the invention as defined in the appended claims.

I claim:

1. A citrus fruit peeling device comprising: a handle; a working element projecting generally longitudinally from said handle; said working element having a peel removing portion circular in section adjacent to the handle and a peel cutting section at its free extremity; said peel removing portion being disposed to extend upwardly at an obtuse angle with respect to said handle; and said cutting section being curved upwardly along an arcuate portion merging with said peel removing portion of the working element.

2. A citrus fruit peeling device comprising: a handle; a working element projecting generally longitudinally from said handle; said working element having a peel removing portion circular in section adjacent to the handle and a peel cutting section at its free extremity; said peel removing portion being disposed to extend upwardly at an obtuse angle with respect to said handle; and said cutting section being curved upwardly along an arcuate portion merging with said peel removing portion of the working element, said cutting section being of generally triangular cross section and having cutting edges at its leading and trailing edges, said cutting edges merging longitudinally with the leading and trailing faces of said peel removing portion.

References Cited in the file of this patent

UNITED STATES PATENTS

| | | |
|---|---|---|
| 379,238 | McNeal | Mar. 13, 1888 |
| 379,328 | Porter | Mar. 13, 1888 |